US005774554A

United States Patent [19]

Gilham

[11] Patent Number: 5,774,554

[45] Date of Patent: Jun. 30, 1998

[54] POSTAGE METER SYSTEM AND VERIFICATION OF POSTAGE CHARGES

[75] Inventor: Dennis Thomas Gilham, Brentwood, United Kingdom

[73] Assignee: Neopost Limited, Essex, United Kingdom

[21] Appl. No.: 617,326

[22] Filed: Mar. 18, 1996

[30] Foreign Application Priority Data

Mar. 17, 1995 [GB] United Kingdom .................. 9505433

[51] Int. Cl.[6] ................................ H04L 9/00; G06F 7/06

[52] U.S. Cl. ................................ 380/51; 380/23; 380/49; 705/408

[58] Field of Search ................................ 380/51, 23, 25, 380/49; 364/464.18, 918.52; 705/401, 403, 404, 405, 408

[56] References Cited

U.S. PATENT DOCUMENTS

| | | | |
|---|---|---|---|
| 4,649,266 | 3/1987 | Eckert | 380/51 X |
| 4,999,481 | 3/1991 | Baer et al. | 705/408 X |
| 5,375,172 | 12/1994 | Chrosny | 380/51 |
| 5,390,251 | 2/1995 | Pastor et al. | 380/21 |

FOREIGN PATENT DOCUMENTS

| | | | |
|---|---|---|---|
| 0331352 A | 9/1989 | European Pat. Off. . | |
| 0388843 A | 9/1990 | European Pat. Off. | G07B 17/04 |
| 2174039 | 10/1986 | United Kingdom | G07B 17/04 |
| 221144 | 6/1989 | United Kingdom | G07B 17/04 |

*Primary Examiner*—Thomas H. Tarcza
*Assistant Examiner*—Pinchus M. Laufer
*Attorney, Agent, or Firm*—Shoemaker And Mattare, Ltd.

[57] ABSTRACT

Methods of verifying use of postage charges in respect of mail items are disclosed. An authentication code is derived from a secret identification of a sender and a part of the destination address of the item. The code is printed on the mail item together with a sender account reference. On receipt of the mail item, the postal authority is able to use the account reference to access the secret identification and thereby determine if the destination address derived corresponds to that printed on the mail to verify the payment for the postage charge. In a modification, each time a postage meter effects a transaction with a remote center, the remote center generates and transmits to the meter a transaction number. The meter utilises a unique key to generate an encrypted code based on an item count and the transaction number. The code and a meter identification are printed on the mail. The postal authority reads the meter identification to access the unique key to decrypt the code and then compares the current transaction number with the transaction number derived from the code in order to verify the postage charges used by the sender.

3 Claims, 4 Drawing Sheets

POSTAGE METER SYSTEM AND VERIFICATION OF POSTAGE CHARGES

BACKGROUND OF THE INVENTION

This invention relates to postage meters for printing franking impressions on mail items in respect of postage charges levied on those items and to verification of authenticity of the franking impressions printed on the mail items.

As is well known, postage meters carry out accounting procedures in respect of postage charges for mail items whereby the meter determines the revenue to the postal authority in respect of the postage charges applied to mail items by the user of the postage meter. When used in an authorized manner the amount of the postage charge printed in the franking impression is properly accounted for. Postage meters are constructed in a secure manner to prevent or at least inhibit use of the postage meter in an unauthorized manner. In the event that security is breached and the meter used in an unauthorized manner evidence of such breach is provided. The secure construction of the postage meter inhibits unauthorized access to the accounting means and to the print head of the postage meter whereby attempts might be made to operate the postage meter in a fraudulent manner in which for example higher amounts of postage charge are printed than are accounted for by the accounting means. It will be appreciated that, if franking impressions are printed on mail items and the cost of the postage charges represented by the franking impressions have not been properly accounted for, revenue value is stolen from the postal authority.

A further possibility of fraud on the postal authority is that a franking impression genuinely printed by a postage meter is replicated on a plurality of mail items whereby only the cost of postage charge for a single item is accounted for in respect of a plurality of items.

SUMMARY OF THE INVENTION invention comprises a method of verifying postage charges used by a mail sender against postage purchased by the mail sender. The method includes the steps of storing a current transaction identity number at a remote center and each time a transaction to purchase postage from a remote center is effected, the remote center generates a new transaction identity number and transmits the new transaction identity number to a mail sender's postage meter. The mail sender's postage meter generates a serial number for each mail item processed by the postage meter and uses a unique key to generate an encrypted code from the serial number and the current transaction identity number. A franking impression, the encrypted code and an identification number relating to the postage meter are printed on the mail item. The mail is checked at a postal authority mail handling depot by reading the printed information from the mail item and using the identification number to determine the unique key and the current transaction identity number. The unique key is used to decrypt the encrypted code to yield the current transaction identity number. Comparison of the current transaction identity number stored in the remote center with the transaction identity number obtained from the encrypted code printed in the printed information enables the postage charge for the mail item to be verified.

BRIEF DESCRIPTION OF THE DRAWING

An embodiment of the invention will be described hereinafter by way of example with reference to the drawings in which.

DESCRIPTION OF THE PREFERRED EMBODIMENT

Figure 1:
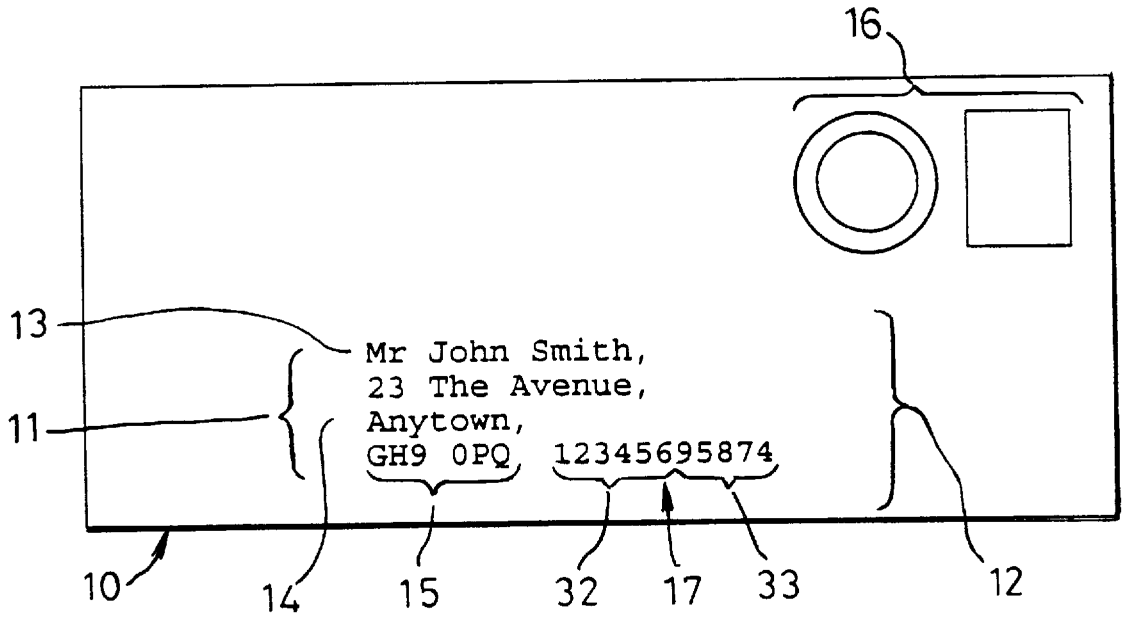
FIG. 1 illustrates a mail item.

Reference will be made first to FIG. 1 of the drawings. As is well known, mail items 10 such as envelopes carry destination information 11 and this information usually is located in a central area 12 of the envelope. The destination information may be printed on the outer surface of the envelope or, where window envelopes are used, the destination information is printed on an insert in the envelope. The destination information consists of a recipient 13 and postal address 14 to which it is required that the mail item be delivered by the postal authority, the postal address including a post code 15. The destination information 11 is in plain text of human readable characters but it is common for some mailers, especially high volume mailers, to print the post code 15 in bar code form.

Figure 2:
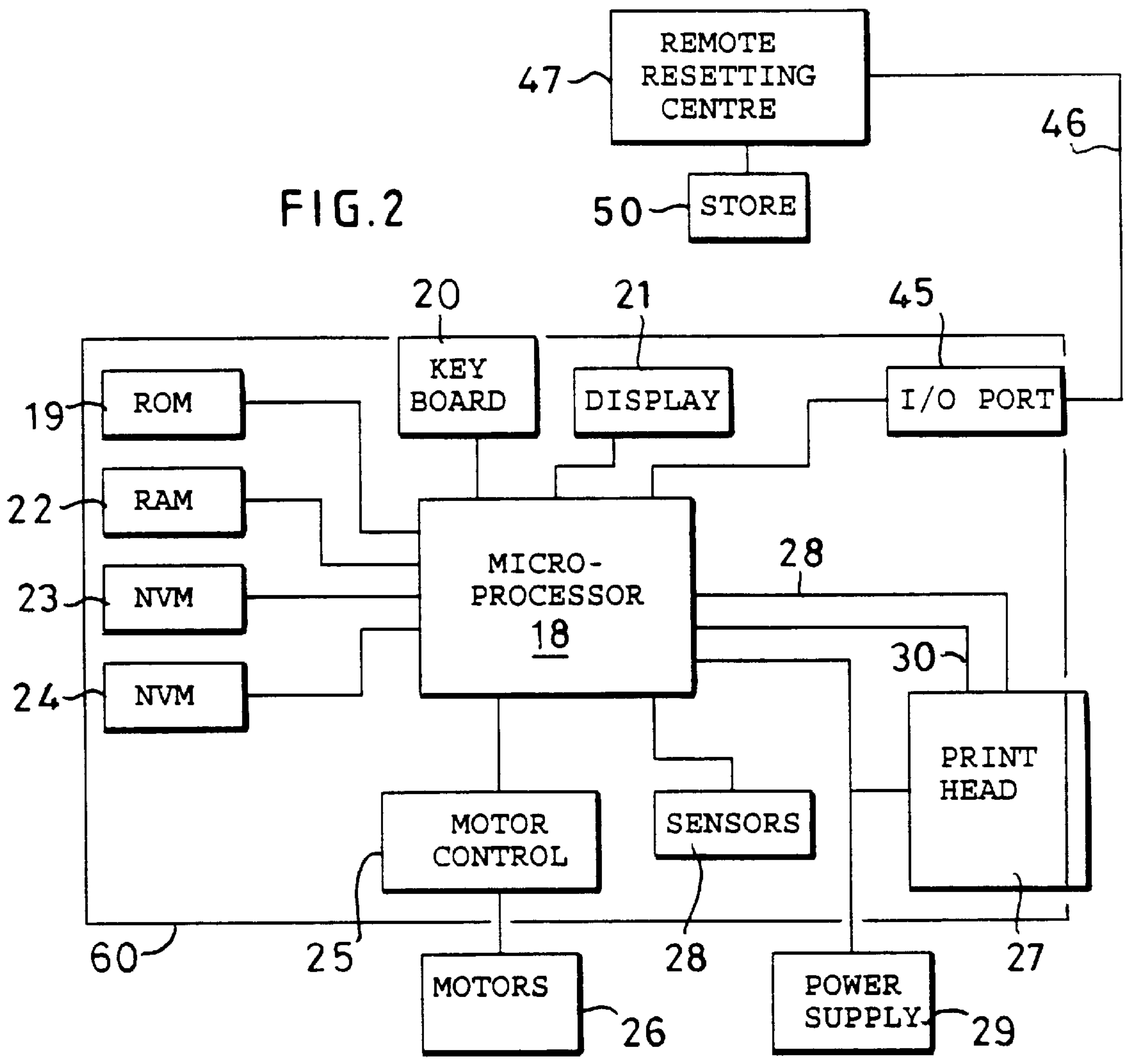
FIG. 2 is a block diagram of mail preparation apparatus at a mail sender's location.

Referring now to FIG. 2, mail preparation apparatus is similar to a postage meter and includes electronic accounting and control means comprising a micro-processor 18 operating under program routines stored in a read only memory (ROM) 19. A keyboard 20 is provided for input of commands to control operation of the apparatus by a user. The keyboard also enables input of data such as postage charge and destination address information. A display 21 is provided to enable display of information to the user. A random access memory (RAM) 22 is provided for use as a working store for storage of temporary data during operation of the postage meter. Non-volatile memories 23, 24 are provided for the storage of critical data relating to use of the postage meter and which is required to be retained even when the postage meter is not powered. The microprocessor 18 carries out accounting functions in relation to use of the postage meter for franking mail items with postage charges applicable to handling of the mail items by the postal authority or another carrier. Accounting data relating to use of the postage meter for printing franking impressions representing postage charges for mail items and any other critical data to be retained is stored in the non-volatile memories 23, 24. The accounting data includes a value of credit available for use by the meter in franking mail items 10, an accumulated total of value used by the meter in franking mail items, a count of the number of mail items franked by the meter and a count of the number of mail items franked with a postage charge in excess of a predetermined value. The value of credit is stored in a descending credit register, the accumulated total value is stored in an ascending tote register, the count of items is stored in an items register and the count of items franked with a postage charge in excess of a predetermined value is stored in a large items register. As is well known in the postage meter art, each of the registers referred to hereinbefore for storing accounting data is replicated in order to enable integrity of the accounting data to be maintained even in the event of a fault or termination of power to the meter during a franking operation. Two replications of each of the registers are provided in each of the memory devices 23, 24.

A motor controller 25 is controlled by the microprocessor 18 to control operation of motors 26 driving feeding means (not shown) for feeding a mail item past a digital print head 27. The digital print head 27 is preferably a thermal print head including selectively energisable thermal printing elements. Sensors 28 are provided to sense and monitor feeding of the mail item. The sensors provide signals to the microprocessor to enable the microprocessor to control feeding of the mail item and to selectively energize the thermal print elements of the print head 27 at appropriate times as the mail item is fed past the print head. As the mail item is fed past the thermal printing elements of the print head 27 during a printing operation, the microprocessor outputs on line 28, in each of a series of printing cycles, print data signals selecting those ones of the printing elements which are to be energized in each respective printing cycle. A pulse of electrical power is supplied to the selected thermal printing elements from a power source 29 when a strobe signal is supplied by the microprocessor on a line 30 to the print head.

Repeated selection and energisation of selected printing elements in the series of printing cycles results in printing of dots in required positions of a corresponding series of columns spaced along the mail item in the direction of feeding of the item. Accordingly a complete printed impression is built up in a column by column manner in the series of printing cycles of a printing operation. It is to be understood that although the mail preparation apparatus is described hereinbefore as including a thermal printer for printing on mail items, other types of digital printing device such as, for example, impact dot matrix, ink jet and laser may be provided.

Figure 3:
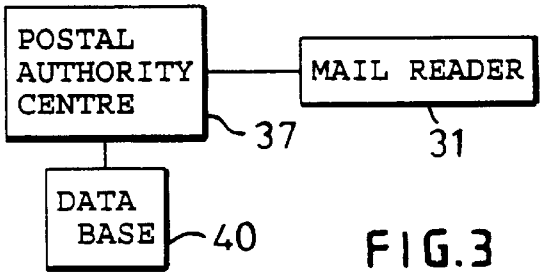
FIG. 3 is a block diagram of mail receiving apparatus at a postal authority location.

Postal authorities utilize automated equipment to handle a very high proportion of the mail items received in the postal system. Such equipment, as shown in FIG. 3, is provided with electronic means 31 for reading the destination information. The reading means 31 is required to operate reliably at high feed speeds of the mail items and consequently is expensive. Accordingly, since the reading means is required to capture data only from the destination information 11, the reading means has a range of vision extending from adjacent a lower edge of the envelope to an extent sufficient to span the area 12 in which the destination information is located. As a result the reading means does not necessarily scan the upper area of the envelope in which any franking impression 16 is printed.

Revenue protection can be improved if the activity of a sender of mail is checked against postage value purchased by the sender. Any substantial discrepancy between the monitored activity and the postage value purchased indicates the likelihood of fraud and can then be investigated.

The address information 14 is required to be processed on all mail items and hence it is proposed to embed information 17 identifying the sender of the mail item in the destination information 11 and to capture this identification information at the same time that the destination address 11 is read. The sender identification 17 may be merely the post code of the sender but this would be too easy for anyone to copy for fraudulent purposes. Therefore it is preferred that the sender identification 17 be protected so as to provide security both for the sender and for the postal authority.

Figure 4:
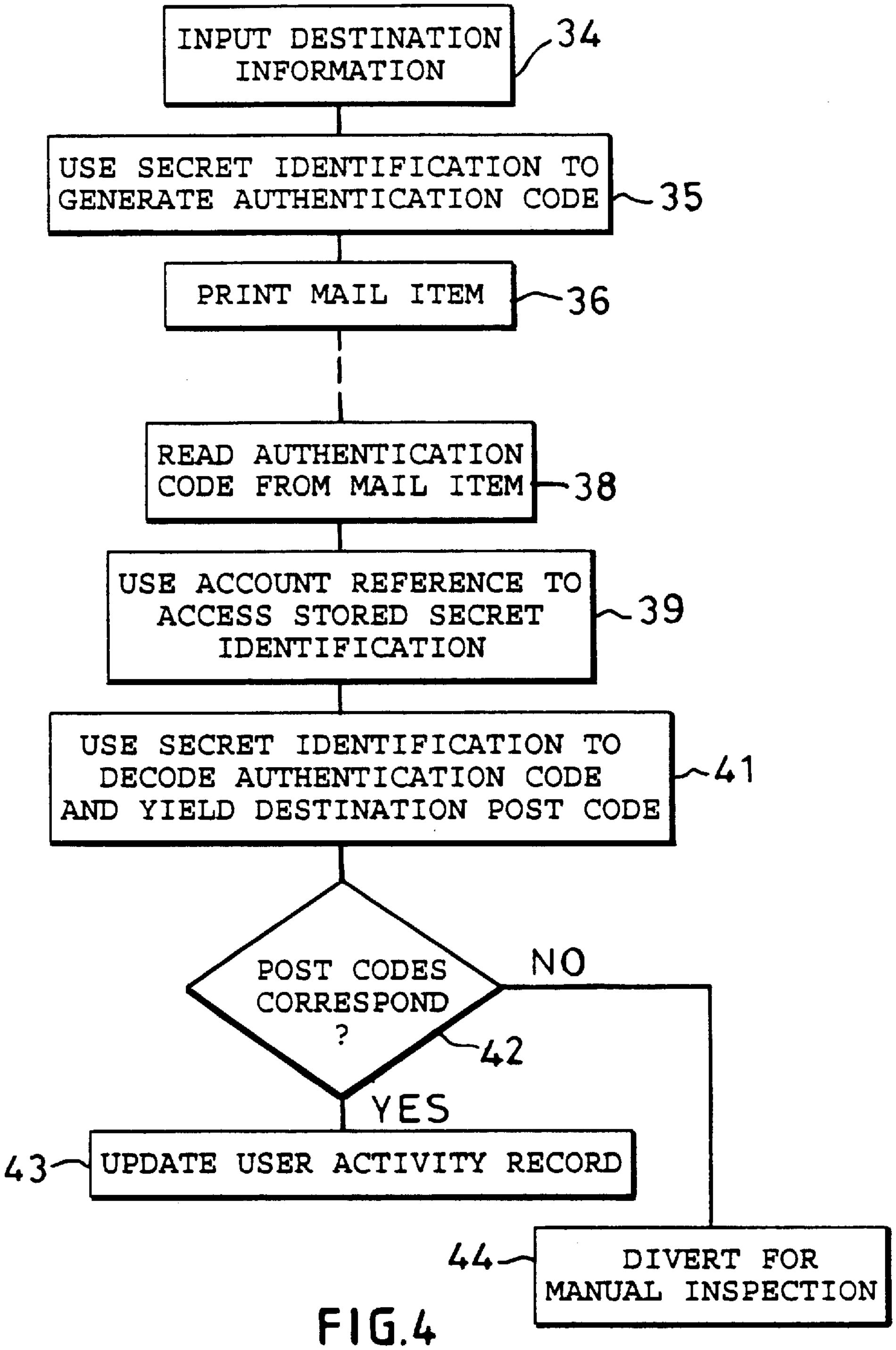
FIG. 4 is a flow chart of steps carried out by the apparatus of FIGS. 2 and 3 in preparing mail items and in verification of postage charges in a first method.

The sender identification printed on the mail item includes two elements. The first element is a sender account reference 32 by which the postal authority can identify the sender and the second element is an authentication code 33. Referring to FIG. 4, after input of the destination information (step 34) the microprocessor 18 generates (step 35) the authentication code using an algorithm which operates on a selected part of the destination information to be printed on the mail item, for example the destination post code 15. An identity number, stored in the memories 23, 24 and known only to the sender and the postal authority is used in generation of the authentication code to ensure that the authentication code is unique to the sender. Software controlling operation of the apparatus includes routines stored in ROM 19 to generate the authentication code. The microprocessor 18, operating under the control of software routines operates the printer 27 to print (step 36) a franking impression and the destination information, the latter including the sender identification.

The authentication code may be printed in character form, i.e alpha-numeric, or in bar-code or other symbolic code form. If the authentication code is printed in bar-code form it may be combined with a destination post code printed in bar-code form as a two stack bar-code, or alternatively as an extended bar code.

When a mail item is received at a postal authority sorting office, the mail reader 31 of an automated mail handling system 37 at the postal authority reads (step 38) the authentication code and uses (step 39) the account reference read from the mail item to determine, from a database 40, the identity number of the sender. The identity number is then used (step 41) to decode the authentication code to yield a destination post code for the item. The destination post code yielded by step 41 is checked (step 42) with the destination code 15 read from the destination address printed on the item to provide a verification of authenticity of the item. If the check (step 42) indicates correspondence between the post codes (YES output of step 42), the mail handling process is continued and the senders activity record in the database 39 is updated (step 43). However if the check indicates a lack of verification (NO output of step 42), the mail item is diverted (step 44) for manual inspection. The activity record of the sender may be merely a record of the number of mail items processed in a period of time or an audit trail containing number of items, dates and destinations of the items.

Using the number of mail items received by the postal authority from a sender and an average postage charge value, the postal authority is enabled to estimate an approximate total postage charge value of items received from that sender and to correlate the estimated total postage charge value with the amount of postage purchased by that sender. Postage meters also account for the number of mail items printed with a franking impression and this information may be utilized to provide further correlation between mail items processed by the postage meter and mail items received by the postal authority. It will be appreciated that checking the activity of the sender as described hereinbefore and correlating this information against purchase of postage can improve the security of revenue to the postal authority without costly change, either in cost or performance, to the automated mail handling equipment of the postal authority.

Duplication of an authentic franking impression is relatively easy using commonly available equipment. Franking impressions which are not authentic and are merely a copy of an authentic impression may be detected if an element of the destination information is included in the franking impression. However this does not fit well with the normal manner in which mail is handled by a sender. Usually, the mail item is prepared by printing the destination information at one location of the sender's premises and the franking impression is printed subsequently at a different location of the sender's premises. Another approach is for the postal authority to read all franking impressions and to capture the postage charges thereof to generate a record of total postage charge used. This record can then be used as a check against postage purchased by the sender. Furthermore this may not be able to detect all attempts at fraud as readily as is required.

An improvement in detection of attempts at fraud may be obtained by shortening the time period over which a comparison of the information is carried out. Accordingly information is included in the franking impression which is a function of a meter control transaction. A control transaction may be either resetting the meter with a new postage credit amount and reading meter registers or just reading the meter registers. The registers may include the number of mail items processed by the meter.

Figure 5:
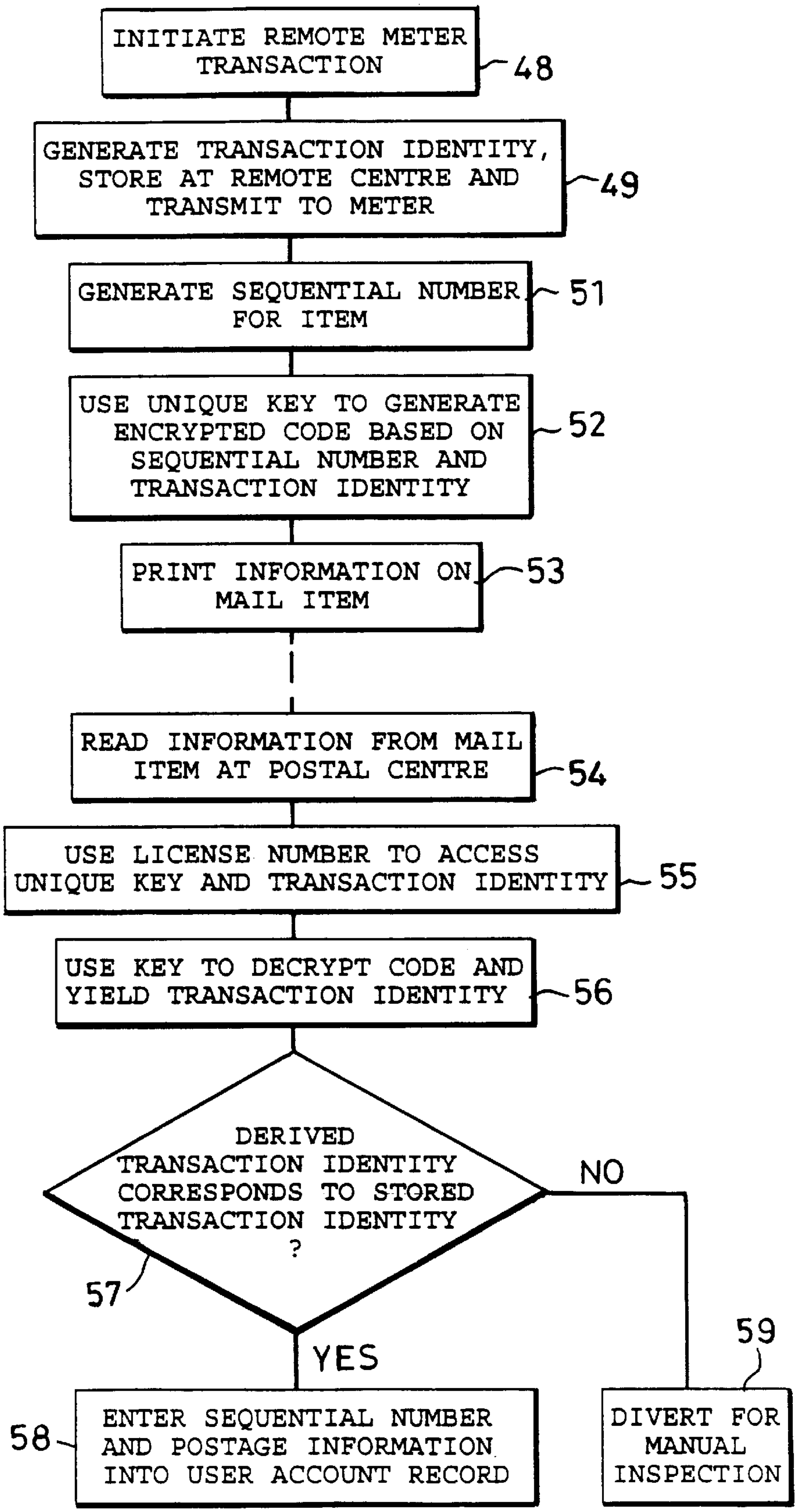
FIG. 5 is a flow chart of steps carried out by the apparatus of FIGS. 2 and 3 in an alternative method.

The mail preparation apparatus, shown in FIG. 2, is provided with an I/O port 45 to enable communication via a communication link 46, for example a telephone network, with a remote resetting center 47 whereby transactions with the remote center may be effected. Referring now to FIG. 5, each time when a remote transaction is initiated (step 48), a transaction identity number is generated (step 49) by the remote center 47 and is stored in a store 50 at the remote center. The transaction identity number is transmitted from the remote resetting center 47 to the 15 postage meter and this transaction identity number is stored in the non-volatile memories 23, 24. The postage meter generates (step 51) a sequential item number for each mail item and this is combined (step 52) with the transaction identity number to form an encrypted code. The encryption may be effected using a unique key and a non-linear algorithm. The postage meter prints (step 53) information on the mail item, the printed information includes the franking impression 16 including a postage charge value for the mail and the information also includes the meter license number, sequential number of that item and the encrypted code. The printed information is read (step 54) by the mail reader 31 and captured by the postal authority automated mail handling system 37 during normal processing of the mail items. The license number is used to determine (step 55) from the database 40 the unique key and the current transaction identity number. The unique key is used to decrypt (step 56) the code and thereby yield the transaction number embedded in the code. The transaction identity number obtained from the code is checked (step 57) against the transaction number from the database 40. If the check is satisfactory (YES output of step 57) the sequential item number and the postage charge for the item are then entered (step 58) into the senders account record. Otherwise if the check is not satisfactory (NO output of step 57), the mail item is diverted (step 59) for manual inspection. It is preferred that the meter license number, sequential number of the item and the encrypted code are included as a part of the franking impression but if desired these information items may be printed on a different part of the mail item and for example may be printed in an area 12 of the mail item in which a destination is printed.

It will be appreciated that where information printed as a part of the franking impression is required for use in monitoring the activity of the sender, it is necessary that means be provided for automatically reading the area of the envelope in which the franking impression is printed.

It will be appreciated that operations and steps carried out in the postage meter are performed by the microprocessor 18 under the control of program routines stores in ROM. Furthermore, as is well known in the postage meter art, the postage meter must operate in a secure manner and be protected from attempts to use the meter fraudulently for example by utilising the postage meter to print franking impressions on mail items for which no corresponding postage charge has been accounted for by the accounting means. Accordingly those parts of the postage meter required to be secured against unauthorized tampering are housed in a secure housing 60.

I claim:

1. A method of verifying postage charges used by a mail sender against postage purchase from a remote center by the mail sender including the steps of:

a) generating a new transaction identity number at the remote center each time a transaction to purchase postage is effected between the remote center and a postage meter used by the mail sender;

b) transmitting the new transaction identity number to the postage meter;

c) generating at the postage meter a serial number for each mail item processed by the postage meter;

d) storing at the postage meter a key uniquely associated with the postage meter and storing said key in a data base of keys at the remote center;

e) using said key to generate an encrypted code based on the serial number and the transaction identity number;

f) printing on each mail item a franking impression, said encrypted code and a meter identification number identifying the postage meter; and at a postal authority mail handling depot the steps of:

g) reading at least the meter identification number and the encrypted code from a mail item received at the postal authority mail handling depot;

h) using the meter identification number to determine said key from the database of keys;

i) using the meter identification number to determine the current transaction identity number stored at the remote center;

j) using said key to decrypt the encrypted code to yield the transaction identity number from said encrypted code; and k) comparing the current transaction identity number stored in the remote center with the transaction identity number obtained from the encrypted code printed in the printed information.

2. Apparatus for verifying postage charges used by a mail sender against postage purchased by the mail sender including at a remote center:

a) memory means storing a transaction identity number and a unique key relating to a postage meter;

b) means operative each time a transaction to purchase postage is effected between the remote center and the postage meter located at the mail sender to generate a current transaction identity number to be stored in the memory means as the current transaction identity number and to transmit the current transaction identity number to the postage meter;

said postage meter including:

c) a mail item counter operative to generate a serial number for each mail item processed by the postage meter;

d) coding means operative to use the key to generate an encrypted code based on the serial number and the current transaction identity number;

e) printing means for printing on each mail item, f) control means operative to control the printing means to print, on each mail item, information including a franking impression, said encrypted code and an identification number relating to the postage meter; and postal authority mail handling apparatus including:

g) reading means to read the printed information on each mail item;

h) means responsive to the reading means and operative in response to the identification number read from the mail item to determine the unique key and the current transaction identity number stored by said memory means and relating to the postage meter;

i) decoding means responsive to the unique key to decrypt the encrypted code to yield the current transaction identity number and j) comparison means to compare the current transaction identity number stored in the memory means of the remote center with the transaction identity number obtained from the encrypted code printed in the printed information on the mail item.

3. A method as claimed in claim 1 wherein the encrypted code and the identification number are printed as a part of the franking impression.

* * * * *